United States Patent

Breda et al.

[11] 4,052,376
[45] Oct. 4, 1977

[54] MIXED CHROMIFEROUS COMPLEX DERIVED FROM TWO DIFFERENT ARYL-AZO-PYRAZOLONE DYESTUFF

[75] Inventors: Antoine Georges Léon Jacques Breda, Boisguillaume; Claude Marie Henri Emile Brouard, Sotteville les Rouen, both of France

[73] Assignee: Produits Chimiques Ugine Kuhlmann, Paris, France

[21] Appl. No.: 546,155

[22] Filed: Jan. 31, 1975

[30] Foreign Application Priority Data

Feb. 6, 1974   France .................. 74.03912

[51] Int. Cl.² .................. C09B 45/06; C09B 45/16; C09B 45/48; D06P 3/24
[52] U.S. Cl. .................. 260/145 B; 8/42 B; 260/147; 260/162; 260/163
[58] Field of Search .................. 260/145 B, 147

[56] References Cited

U.S. PATENT DOCUMENTS

| 3,879,336 | 4/1975 | Maeda et al. ................ 260/37 N |
| 3,880,797 | 4/1975 | Maeda et al. ................ 260/37 N |

FOREIGN PATENT DOCUMENTS

| 243,954 | 11/1959 | Australia .................. 260/145 B |
| 562,048 | 8/1958 | Canada .................. 260/147 |

Primary Examiner—Daniel E. Wyman
Assistant Examiner—John J. Doll
Attorney, Agent, or Firm—Beveridge, DeGrandi, Kline & Lunsford

[57] ABSTRACT

Chromiferous complex dyestuff of the formula:

(I)

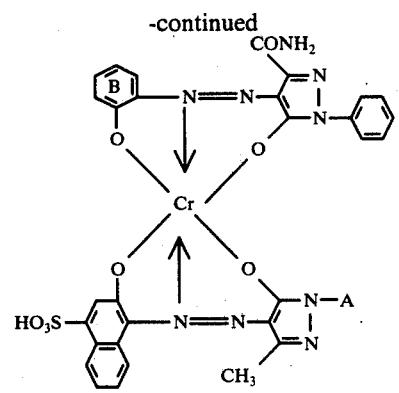

in which A represents a hydrogen atom, an unsubstituted phenyl group or a phenyl group substituted by one or two halogen atoms or alkyl groups containing 1 to 4 carbon atoms and the nucleus B is unsubstituted or substituted by one or two chlorine atoms; salts of such dyestuff; process for the preparation of such a dyestuff which comprises reacting in equimolecular proportions the 1/1 chromiferous complex of a monoazo dyestuff of the formula:

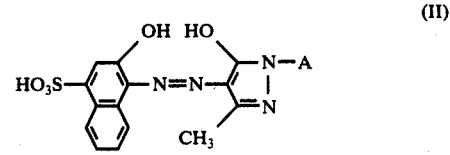

(II)

and a monoazo dyestuff of the formula:

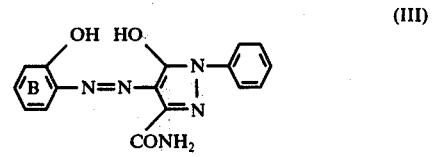

(III)

or, conversely, the 1/1 chromiferous complex of a monoazo dyestuff of formula (III) and a monoazo dyestuff of formula (II) wherein A and B have the meanings given above; process for the coloration or dyeing in bulk of a synthetic polyamide in which the coloring agent is a dyestuff of the formula given above or a salt thereof and materials and articles of synthetic polyamide dyed or colored in bulk by means of chromiferous complex of the formula given above or a salt thereof.

2 Claims, No Drawings

MIXED CHROMIFEROUS COMPLEX DERIVED FROM TWO DIFFERENT ARYL-AZO-PYRAZOLONE DYESTUFF

The present invention relates to new chromiferous complex dyestuffs to a process for their preparation and to their use in the colouration and dyeing in bulk of synthetic polyamides. When we refer to "colouration" we are referring to a process in which a dyestuff is added directly to a molten mass of the polymer and when we refer to "dyeing" we are referring to a process in which polymer granules are dyed, then melted and extruded.

Synthetic polyamides have a high melting point and their fusion is accompanied by a strong reducing effect. Few organic dyestuffs have sufficient stability for them to be considered for use for the colouration or dyeing in bulk of synthetic polyamide yarn. On the other hand, in the actual state of the art, it is not possible to extrapolate the tinctorial results obtained by conventional dyeing to the results obtained by colouration or dyeing in bulk of synthetic polyamides.

It has now been found, quite unexpectedly, that new chromiferous complex dyestuffs of the general formula:

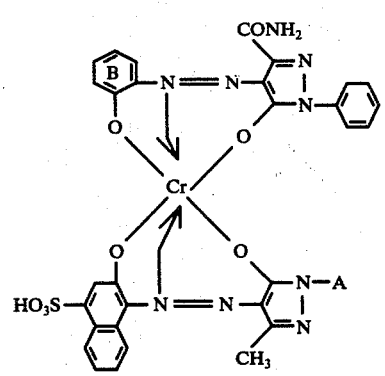

(I)

in which A represents a hydrogen atom, an unsubstituted phenyl group or a phenyl group substituted by one or two halogen atoms or alkyl groups containing 1 to 4 carbon atoms (preferably methyl or ethyl) and the nucleus B is unsubstituted or substituted by one or two atoms of chlorine, and the salts of these complexes enable synthetic polyamides to be coloured or dyed in bulk in red shades with excellent fastness to light, washing, rubbing and to the solvents usual in dry cleaning.

The complexes of formula (I) and their salts may be prepared for example by known general processes, for instance, by reacting equimolecular proportions of the 1/1 chromiferous complex of a monoazo dyestuff of the formula:

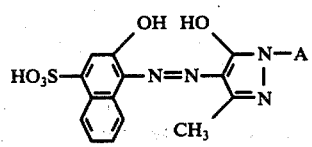

(II)

in which A is as defined above, and a monoazo dyestuff of the formula:

(III)

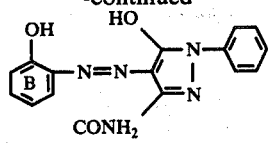

in which the nucleus B may be substituted as previously indicated, or conversely, by reacting the 1/1 chromiferous complex of a monoazo dyestuff of the formula (III) on a monoazo dyestuff of the formula (II).

The chromiferous complexes according to the invention have the feature of not subliming and of preserving their tinctorial yield and their shade, even after an exposure of 45 minutes at a temperature of 290° to 300° C. This property is preserved even if the period at 290° to 300° C. is made in fused polyamides such as the polyamides 6, 6-6 and 11, which are the most generally used to obtain textile threads or filaments, as well as coarse fibres, sheets or foils, or moulded or extruded objects.

This property of the chromiferous complexes according to the invention enables them to be used for the colouration and for dyeing in bulk of synthetic polyamide yarn.

For this purpose, the powdered dyestuff may be previously mixed with the polyamide (which may be, for example, granulated or powdered), then the mixture is homogenised in a screw extruder at a temperature 10°–15° C. above the fusion temperature of the polymer. On coming out of the extruder the mixture may either be cooled, then granulated and stored, such as in hoppers which feed the melting pots of the spinning mill, or maintained in molten form and introduced directly by means of metering pumps into the melting pots of the spinning mill.

It is also possilbe, especially in the case of polyamide 6, to carry out dyeing in an aqueous medium on the granulated polymer before its transformation into fibres. This operation is effected under the usual conditions for dyeing polyamides in an acid medium. It is however necessary for the ratio of the dyebath to be from 1.5 to 5. After dyeing, the dyed polyamide is dried then extruded under the usual conditions.

The new dyestuffs according to the invention have a high level of solubility in the polyamides which allows them to be used for colouring at very strong intensity, even very fine threads, as for example polyamide 6-6 filaments of two decitex coloured with 2% of dyestuff, without any of the incidents being produced which are commonly met with during spinning with dyestuffs which are too soluble or with pigments. These incidents are most often manifested by a stoppage of the filters protecting the very fine orifices of the spinnerets or by frequent breaks of the filaments, chiefly during drawing operations.

Whatever may be the method of incorporation of the new dyestuffs in the polyamide polymer, the colourations obtained maintain the same properties: very high tinctorial yield, very bright hues, which are particularly appreciated in the field of furnishings such as carpets, hangings, floor coverings. The fastness to tests standardised by the International Standard Organisation (I.S.O.) and by the European Group of International Studies (E.C.E.) for textile articles, especially the fastness to light, washing, rubbing and to the solvents usual in dry cleaning, is excellent.

The invention is illustrated by the following Examples in which the parts and the percentages are by weight.

EXAMPLE 1

140 Parts of a press paste, corresponding to 17.7 parts of pure monoazo dyestuff, obtained by coupling the diazonium salt of 4,6-dichloro-2-aminophenol with 1-phyenyl-3-carbonamido-5-pyrazolone are introduced into 1000 parts of demineralised water, as well as 32.2 parts of a press paste containing 7.6% of chromium, obtained by chroming in an acid medium of the dyestuff [2-hydroxy-4-sulpho-naphthalene]-<1 azo 4<-[5-hydroxy-3-methyl-1-phenyl-pyrazole] and corresponding to 24.8 parts of 1/1 chromium complex. The suspension is slowly heated with good agitation and 11 parts of sodium carbonate are added when the temperature reaches 50° C. The formation of the ½ complex is practically finished when the temperature of the reaction mass reaches 95°–100° C. After cooling to 80° C. the mixed complex formed is precipitated by the addition of 100 parts of sodium chloride. It is again cooled with stirring, then filtered and dried in an oven at 80° C. 67 parts of a red dyestuff of excellent quality are thus obtained.

On operating in the same way from the monoazo dyestuff of formula (III) indicated in the third column of the following Table and the 1/1 chromium complex of the monoazo dyestuff of formula (II) indicated in the second column, other mixed complexes according to the invention of red shades are obtained.

| Ex. | Monoazo dyestuff of formula (II) | Monoazo dyestuff of formula (III) |
|---|---|---|
| 2 | [2-hydroxy-4-sulpho-naphthalene]-<1 azo 4>-[5-hydroxy-3-methyl-1-phenyl-pyrazole] | [5-chloro-2-hydroxy-benzene]-<1 azo 4>- [3-carbonamido-5-hydroxy-1-phenyl-pyrazole] |
| 3 | [2-hydroxy-4-sulpho-naphthalene]-<1 azo 4>-[5-hydroxy-3-methyl-1-phenyl-pyrazole] | [4-chloro-2-hydroxy-benzene]-<1 azo 4>-[3-carbonamido-5-hydroxy-1-phenyl-pyrazole] |
| 4 | [2-hydroxy-4-sulpho-naphthalene] <1 azo 4>-[2',5'-dichloro-1-phenyl-5-hydroxy-3-methyl-pyrazole] | [4-chloro-2-hydroxy-benzene]-<1 azo 4>-[3-carbonamido-5-hydroxy-1-phenyl-pyrazole] |
| 5 | [2-hydroxy-4-sulpho-naphthalene]-<1 azo 4>-[5-hydroxy-3-methyl-1-p-tolyl-pyrazole] | [3,5-dichloro-2-hydroxy-benzene]-<1 azo 4>-[3-carbonamido-5-hydroxy-1-phenyl-pyrazole] |
| 6 | [2-hydroxy-4-sulpho-naphthalene]-<1 azo 4>-[5-hydroxy-3-methyl-1-m-tolyl-pyrazole] | [3,5-dichloro-2-hydroxy-benzene]-<1 azo 4>-[3-carbonamido-5-hydroxy-1-phenyl-pyrazole] |
| 7 | 4-sulpho-2-hydroxy-naphthalene]-<1 azo 4>-[3-methyl-5-hydroxy-pyrazole] | [5-chloro-2-hydroxy-benzene]-<1 azo 4>-[3-carbonamido-5-hydroxy-1-phenyl-pyrazole] |

EXAMPLE 8

100 Parts of polyamide 6-6(polyhexamethylene-adipamide) and 0.5 parts of the dyestuff obtained in Example 1 are mixed for an hour in a cylindrical vessel turning on its axis. The mixture is then introduced into a screw extruder of which the spinneret is taken to 285° C. At the exit of the extruder, the mixture is cooled, then converted into grains having about 2 mm as their greatest dimension. The grains are dried, then introduced into a spinning apparatus where the fused mixture is subjected to a constant pressure on a fusion grating at 290° C. before passing on to a filter bed based on washed and roasted river sand the grains of which have a dimension of the order of 0.03 mm, then through a spinneret having seven orifices of 0.23 mm diameter. The control of the apparatus is effected so that after a subsequent drawing of coefficient 4 the seven filaments each has a titre of 17 decitex. Filaments of polyamide 6-6 coloured in a red shade are thus obtained which are very fast to light, solvents, washing and friction.

EXAMPLE 9

1.5 Parts of the dyestuff obtained in Example 1 are made into a paste in 7.5 parts of demineralised water at 40° C. The mixture is introduced into a dyeing apparatus able to function under pressure and already containing 1000 parts of demineralised water brought to pH 5 by the addition of acetic acid. Then 300 parts of polyamide 6 in the form of small granules having about 2 mm as their greatest dimension are added, the temperature is taken to about 103° C. in a period of 30 minutes and this temperature is maintained for an hour and a half while stirring. The granules dyed red are then washed in demineralised water, and then dried.

On operating under the conditions of Example 8, they can then be transformed into filaments of a red shade which is very fast to light, solvents, washing and friction.

5
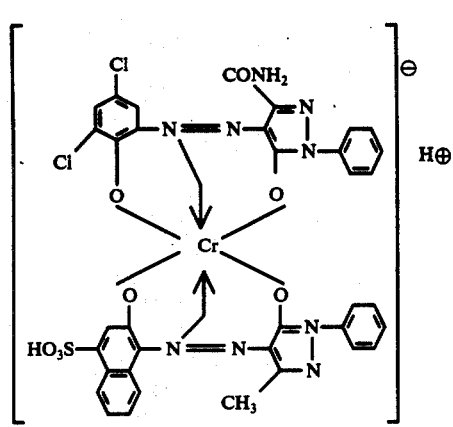
6
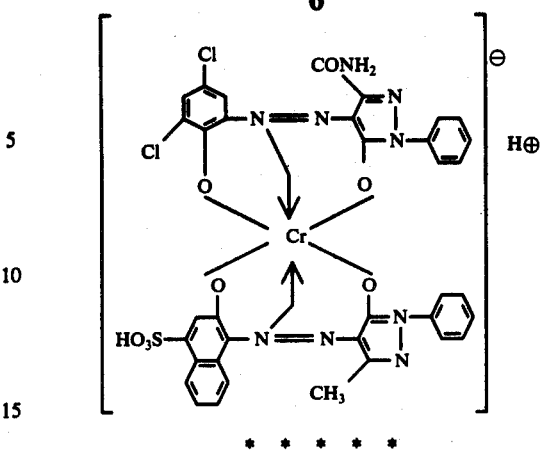

We claim:

1. Chromiferous complex dyestuff having, in the free acid form, the following formula:

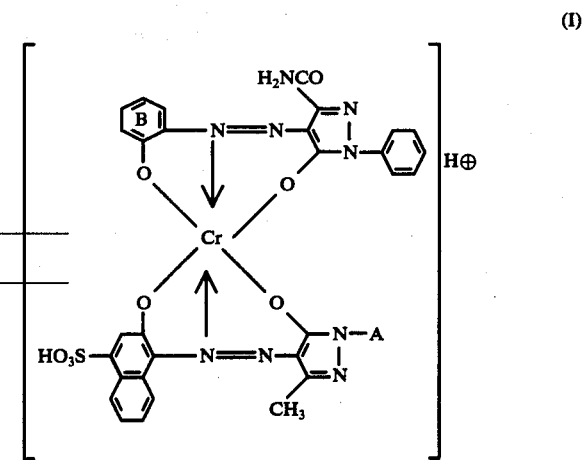

(I)

in which A is unsubstituted phenyl or phenyl substituted by one or two chlorine or by one alkyl containing 1 to 4 carbon atoms and the nucleus B is unsubstituted or substituted by one or two chlorine.

2. The chromiferous complex dyestuff having, in the free acid form, the following formula: